(12) United States Patent
Anderson et al.

(10) Patent No.: US 11,390,382 B1
(45) Date of Patent: Jul. 19, 2022

(54) DELIVERY SYSTEM FOR UNMANNED AERIAL VEHICLES

(71) Applicant: Government of the United States, as represented by the Secretary of the Air Force, Wright-Patterson AFB, OH (US)

(72) Inventors: Michael Anderson, Colorado Springs, CO (US); Benjamin Stark, Dixon, CA (US); Jeffrey Burnett, Severna Park, MD (US); Tyler Copien, San Angelo, TX (US); Candice Roberts, Milford, VA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 549 days.

(21) Appl. No.: 16/504,563

(22) Filed: Jul. 8, 2019

(51) Int. Cl.
*B64C 39/02* (2006.01)
*B64D 5/00* (2006.01)
*B64D 1/12* (2006.01)
*B64D 17/80* (2006.01)

(52) U.S. Cl.
CPC .............. *B64C 39/024* (2013.01); *B64D 1/12* (2013.01); *B64D 5/00* (2013.01); *B64D 17/80* (2013.01); *B64C 2201/027* (2013.01); *B64C 2201/082* (2013.01); *B64C 2201/108* (2013.01); *B64C 2201/206* (2013.01)

(58) Field of Classification Search
CPC .. B64D 1/12; B64D 5/00; B64D 17/80; B64C 2201/082; B64C 2201/206
See application file for complete search history.

(56) References Cited

U.S. PATENT DOCUMENTS

| 8,708,285 | B1 * | 4/2014 | Carreiro | F42B 12/60 244/190 |
|---|---|---|---|---|
| 9,470,477 | B2 | 10/2016 | Su et al. | |
| 9,776,719 | B2 | 10/2017 | Elkins et al. | |
| 9,969,491 | B2 | 5/2018 | Strayer | |
| 10,035,597 | B2 | 7/2018 | Desrochers et al. | |
| 10,906,641 | B1 * | 2/2021 | Anderson | B64C 3/26 |
| 2005/0218260 | A1 * | 10/2005 | Corder | B64C 39/024 244/49 |

(Continued)

*Primary Examiner* — Joshua J Michener
*Assistant Examiner* — Arfan Y. Sinaki
(74) *Attorney, Agent, or Firm* — AFMCLO/JAZ; Jeffrey V Bamber

(57) ABSTRACT

A system for deploying an unmanned aerial vehicle in a target region. The system includes a pod configured to be deployed from an air craft in a first region remote from the target region. The pod includes a capsule housing portion and a capsule ejection system in operative communication with the capsule housing portion. A capsule is dimensioned and configured to be disposed in the capsule housing portion as the pod is deployed from the aircraft and is ejected from the capsule housing portion by the capsule ejection system in a second region remote from the first region and the target region. The capsule includes a UAV housing portion dimensioned and configured to encase the unmanned aerial vehicle and a UAV ejection system in operative communication with the UAV housing portion for deploying the unmanned aerial vehicle in the target region.

15 Claims, 6 Drawing Sheets

(56) References Cited

U.S. PATENT DOCUMENTS

| | | | |
|---|---|---|---|
| 2007/0018033 A1* | 1/2007 | Fanucci | F42B 15/22 |
| | | | 244/49 |
| 2012/0012695 A1 | 1/2012 | Robinson | |
| 2012/0205488 A1 | 8/2012 | Powell et al. | |
| 2014/0284427 A1* | 9/2014 | Van Winkle | B64D 17/80 |
| | | | 244/139 |
| 2015/0266578 A1* | 9/2015 | Elkins | B64D 1/12 |
| | | | 244/137.1 |
| 2016/0347476 A1 | 12/2016 | Andryukov | |
| 2017/0166308 A1* | 6/2017 | Desrochers | B64D 1/08 |
| 2017/0260973 A1* | 9/2017 | Larson | B64C 39/024 |
| 2017/0369150 A1* | 12/2017 | Finklea | B64C 3/56 |
| 2018/0065757 A1* | 3/2018 | Pruzan | B64D 39/04 |
| 2018/0170510 A1* | 6/2018 | Brock | B64C 27/12 |
| 2018/0265199 A1* | 9/2018 | Colosimo | B64D 1/10 |
| 2018/0281953 A1* | 10/2018 | Groen | B64D 1/12 |
| 2019/0009879 A1* | 1/2019 | Phan | B64D 17/386 |
| 2020/0115055 A1* | 4/2020 | Kuperman | B60L 53/80 |
| 2021/0237872 A1* | 8/2021 | Peleg | H04N 1/00 |

* cited by examiner

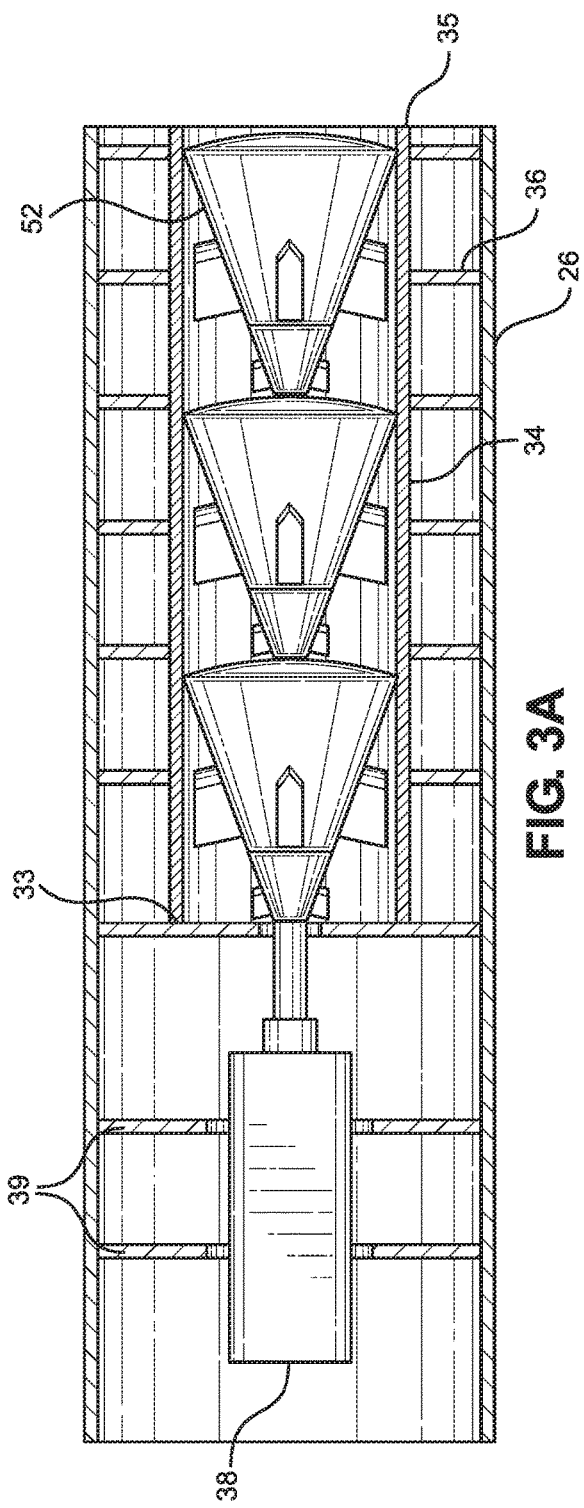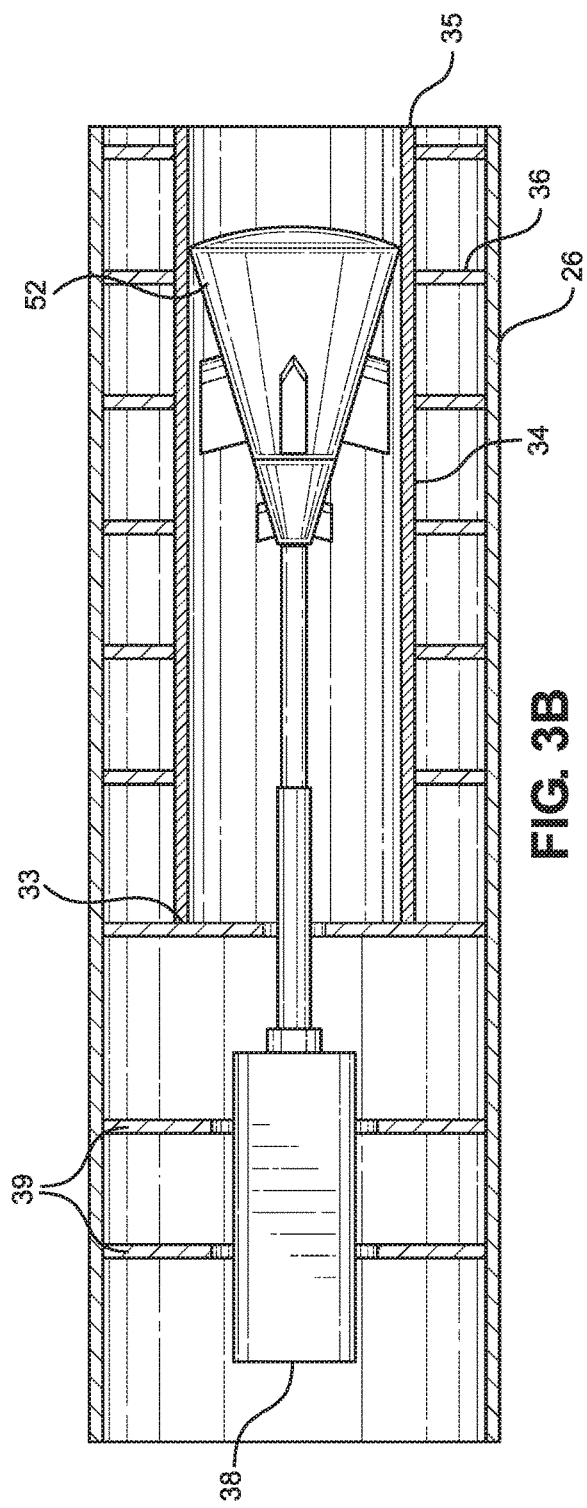

DELIVERY SYSTEM FOR UNMANNED AERIAL VEHICLES

GOVERNMENT INTEREST

The invention described herein may be manufactured, used, and licensed by or for the U.S. Government.

FIELD OF THE INVENTION

The present disclosure relates generally to a delivery system for deploying unmanned aerial vehicles. More particularly, the present disclosure relates to a delivery system for long range deployment of small unmanned aerial vehicles from high-altitude and high-speed aircrafts to a target operational region.

BACKGROUND OF THE INVENTION

An unmanned aerial vehicle ("UAV"), commonly known as a drone, is an aircraft without a human pilot physically located within or on the aircraft. A UAV is a component of an unmanned aerial system ("UAS"), which generally includes one or more UAVs, a ground-based controller, and a system of communications between the UAVs and the ground-based controller. In the past several years, the prevalence and capabilities of UASs has increased rapidly from use by hobbyists for racing purposes, taking video and pictures of landscapes, etc., to use by the U.S. Department of Defense ("DoD") and other military forces to support tactical, operational, and strategic operations. In this regard, the U.S. DoD now categorizes UAVs into five groups, with each category increasing in capability. For example, "Group 1" generally includes UAVs that have a maximum takeoff weight of twenty pounds, that operate at an altitude below 1,200 feet above ground level ("AGL"), and that have a maximum speed of one hundred knots. "Group 2" generally includes UAVs that have a maximum takeoff weight of between twenty-one to fifty-five pounds, that operate at an altitude below 3,500 feet AGL, and that have a maximum speed of less than 250 knots. Groups 3-5 then include UAVs with a higher maximum takeoff weight, ability to operate at higher altitudes, and/or at higher speeds as compared to Group 2 UAVs.

While there are many types of UAVs available with varying sizes, capabilities, and costs, small UAVs, particularly Group 1 UAVs, are often desired in certain military and commercial applications due to their low-cost, stealth, and low-risk advantages. However, their use is currently limited to relatively short-range missions due to their lack of range and endurance. Further, even short-range missions often pose a great risk to military personnel by requiring the UAV to be hand-delivered to within the UAVs range of a desired target. Similarly, with respect to commercial applications, operators are required to bring the UAV close to the location of use. Additionally, the aero-structural components of small UAVs are often relatively fragile, making it it unfeasible to simply launch the small UAVs from ground- or air-based launching systems as the high-speed airflow into which the small UAVs would be launched will often damage the relatively fragile components of the UAV.

In view of the above and other considerations, there is a need for a delivery system for deploying a UAV into a target region, particularly from larger aircrafts traveling at high speeds in a region remote from the target region.

SUMMARY OF THE INVENTION

According to one embodiment of the disclosure, the above and other needs are met by a system for deploying an unmanned aerial vehicle in a target region. The system includes a pod configured to be deployed from an aircraft in a first region remote from the target region. The pod includes a capsule housing portion and a capsule ejection system in operative communication with the capsule housing portion. The system further includes a capsule dimensioned and configured to be disposed in the capsule housing portion as the pod is deployed from the aircraft and ejected from the capsule housing portion by the capsule ejection system in a second region remote from the first region and the target region. The capsule includes a UAV housing portion dimensioned and configured to encase the unmanned aerial vehicle and a UAV ejection system in operative communication with the UAV housing portion for deploying the unmanned aerial vehicle in the target region.

According to certain embodiments, the capsule further includes a parachute operable to be deployed after the capsule is ejected from the capsule housing portion for providing a controlled drop of the capsule from the second region to the target region.

According to certain embodiments, the pod is configured to be remotely controlled to deliver the capsule from the first region to the second region.

According to certain embodiments, the capsule housing portion of the pod is configured to receive a plurality of capsules between a first end and a second end of the capsule housing portion, and the capsule ejection system includes a piston operable to be advanced from the first end of the capsule housing portion to the second end of the capsule housing portion for controlled ejection of the plurality of capsules disposed within the capsule housing portion.

According to certain embodiments, the UAV housing portion of the capsule includes an upper housing section and a lower housing section, the parachute is connected to the upper housing section, and the UAV ejection system includes a release mechanism for separating the lower housing section from the upper housing section such that the unmanned aerial vehicle is deployed in the target region based at least in part by dropping from the upper housing section under the force of gravity. In some embodiments, the release mechanism includes a heat activated adhesive for removably securing the upper housing section to the lower housing section and an actuator for providing heat to the heat activated adhesive for separating the lower housing section from the upper housing section. In certain embodiments, the upper housing section includes a top end and a lower end with the top end having a smaller diameter than the lower end and the parachute being connected to the top end. According to this embodiment, the upper housing section may include a plurality of stabilizing fins disposed around a periphery of the upper housing section adjacent to the top end.

According to certain embodiments, the unmanned aerial vehicle is dimensioned and configured to be encased in the capsule, and the unmanned aerial vehicle includes a plurality of rotor arms each operable to be positioned in a compact position when the unmanned aerial vehicle is encased in the capsule and in an extended position when the unmanned aerial vehicle is deployed from the capsule. In certain embodiments, each of the plurality of rotor arms are biased to the extended position such that the plurality of rotor arms automatically moves to the extended position upon the unmanned aerial vehicle being ejected from the capsule by the UAV ejection system.

According to another embodiment of the disclosure, a system for deploying unmanned aerial vehicles in a target region includes a plurality of unmanned aerial vehicles each operable to be remotely controlled by an unmanned aerial system and each of the plurality of unmanned aerial vehicles operable to transition between a compact position and an extended flight position. The system further includes a pod configured to be deployed from an aircraft in a first region remote from the target region and configured to travel from the first region to a second region remote from both the first region and the target region based on instructions from the unmanned aerial system. The pod includes a capsule housing portion and a capsule ejection system in operative communication with the capsule housing portion. The system further includes a plurality of capsules dimensioned and configured to be disposed in the capsule housing portion as the pod is deployed from the aircraft and ejected from the capsule housing portion by the capsule ejection system in the second region. Each capsule includes a UAV housing portion dimensioned and configured to encase one of the plurality of unmanned aerial vehicles in the compact position, a parachute operable to be deployed after the capsule is ejected from the capsule housing portion for providing a controlled drop of the capsule from the second region to the target region, and a UAV ejection system in operative communication with the UAV housing portion for deploying the unmanned aerial vehicle encased in the UAV housing portion in the target region. According to this embodiment, the unmanned aerial vehicle is configured to transition from the compact position to the extended flight position upon deployment of the unmanned aerial vehicle in the target region.

According to certain embodiments, the capsule ejection system of the pod includes a piston operable to be advanced from a first end of the capsule housing portion to a second end of the capsule housing portion for controlled ejection of the plurality of capsules disposed within the capsule housing portion.

According to certain embodiments, the UAV housing portion of the capsule includes an upper housing section and a lower housing section, the parachute is connected to the upper housing section, and the UAV ejection system includes a release mechanism for separating the lower housing section from the upper housing section such that the unmanned aerial vehicle is deployed in the target region based at least in part by dropping from the upper housing section under the force of gravity. In some embodiments, the release mechanism includes a heat activated adhesive for removably securing the upper housing section to the lower housing section and an actuator for providing heat to the heat activated adhesive for separating the lower housing section from the upper housing section.

According to certain embodiments, each of the plurality of unmanned aerial vehicles include a plurality of rotor arms that are biased to the extended position such that the plurality of rotor arms automatically moves to the extended position upon the unmanned aerial vehicle being ejected from the capsule by the UAV ejection system.

According to yet another embodiment of the disclosure, a method for deploying an unmanned aerial vehicle in a target region includes deploying a pod from an aircraft in a first region remote from the target region, the pod including a capsule housing portion and a capsule ejection system, the capsule housing portion having a capsule disposed in the capsule housing portion, the capsule including a UAV housing portion and a UAV ejection system, the UAV housing portion having the unmanned aerial vehicle encased in the UAV housing portion; flying the pod from the first region to a second region remote from the first region and the target region with the capsule disposed in the capsule housing portion; activating the capsule ejection system to eject the capsule from the capsule housing portion when the pod is disposed in the second region; deploying a parachute from the capsule for providing a controlled drop of the capsule from the second region to the target region; activating the UAV ejection system to eject the unmanned aerial vehicle from the UAV housing portion when the capsule is disposed in the target region; and remotely controlling the unmanned aerial vehicle in the target region following ejection from the capsule.

According to certain embodiments, the first region includes an altitude of about 10,000 feet above ground level or greater and the second region includes an altitude between about 5,000 feet to about 500 feet above ground level.

According to certain embodiments, the method further includes deploying a parachute from the pod to decelerate the pod and position it favorably in a nose-down configuration prior to ejection of the capsule(s) from the capsule housing portion.

According to certain embodiments, the capsule housing portion of the pod is configured to receive a plurality of capsules between a first end and a second end of the capsule housing portion. According to this embodiment, the capsule ejection system includes a piston operable to be advanced from the first end of the capsule housing portion to the second end of the capsule housing portion and the step of activating the capsule ejection system includes advancing the piston from the first end to the second end of the capsule housing portion for controlled ejection of the plurality of capsules disposed within the capsule housing portion.

According to certain embodiments, the UAV housing portion of the capsule includes an upper housing section and a lower housing section, the parachute is connected to the upper housing section, and the UAV ejection system includes a release mechanism for separating the lower housing section from the upper housing section. According to this embodiment, the step of activating the UAV ejection step further includes activating the release mechanism such that the unmanned aerial vehicle is deployed in the target region based at least in part by dropping from the upper housing section under the force of gravity. In some embodiments, the release mechanism includes a heat activated adhesive for removably securing the upper housing section to the lower housing section and an actuator for providing heat to the heat activated adhesive for separating the lower housing section from the upper housing section.

BRIEF DESCRIPTION OF THE DRAWINGS

Other embodiments of the disclosure will become apparent by reference to the detailed description in conjunction with the figures, wherein elements are not to scale so as to more clearly show the details, wherein like reference numbers indicate like elements throughout the several views, and wherein:

FIG. 3A depicts a cross-sectional view of a pod with capsules disposed in the capsule housing portion according to one embodiment of the disclosure;

FIG. 3B depicts the cross-sectional view of the pod of FIG. 3A with the piston being advanced from the first end of the capsule housing portion to the second end of the capsule housing portion for ejection of the capsules disposed within the capsule housing portion;

DETAILED DESCRIPTION OF THE INVENTION

Figure 1:
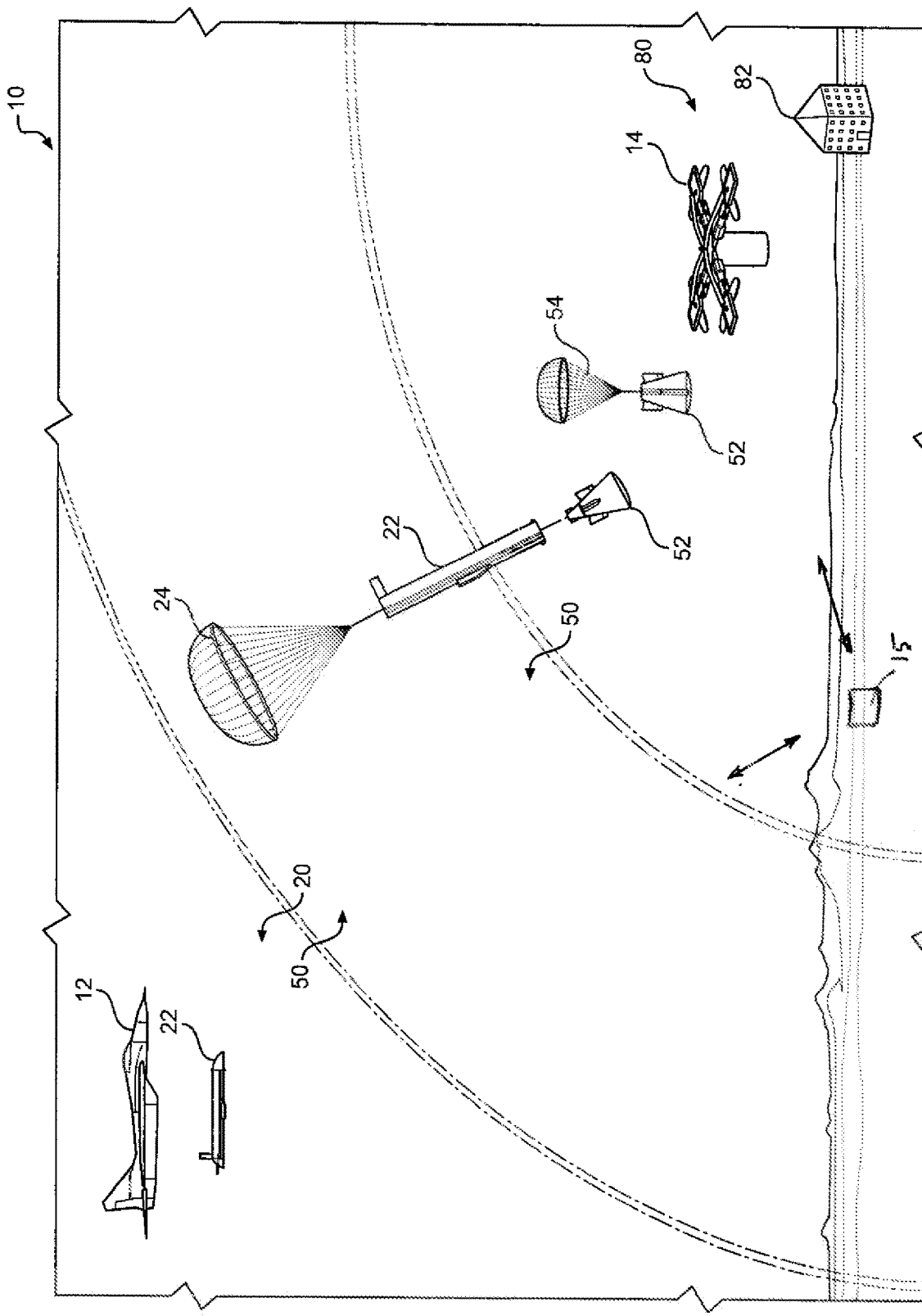
FIG. 1 depicts an operations concept diagram of a delivery system for deploying a UAV in a target region according to one embodiment of the disclosure.

Referring to FIG. 1, a multi-stage delivery system 10 for deploying one or more UAVs 14 from a high-altitude and/or high-speed aircraft 12 to a target region 80 for long range operations is generally depicted according to one exemplary embodiment of the disclosure. As described further below, the multi-stage process includes a combination of devices that allows the one or more UAVs 14 to safely transition from one flight mode to the next in a secured and compact environment until the UAVs are deployed in the target region 80. Upon deployment, the one or more UAVs 14 are configured to be operated in the target region 80 by a remote controller of an unmanned aerial system ("UAS") 15 using wireless communication technologies shown by arrows as known in the art.

While FIG. 1 depicts a commercial application of the system 10 with the target region 80 being exemplified as an isolated building 82, it should be understood that the system 10 of the present disclosure can be used for any number of military or commercial applications in which it would be useful to quickly deploy one or more UAVs 14 from an aircraft. For example, in military applications, system 10 would be useful in surveillance and delivering payloads for remote or highly contested areas. In commercial applications, it is believed that system 10 would be useful in commercial surveying applications where the survey area of interest is at a distance greater than the inherent range of the UAV 14 doing the surveying. Other commercial applications include package delivery to remote or difficult to access areas that are beyond the inherent range of the UAV 14. Thus, for purposes of the present disclosure, the "target region" 80 should broadly be considered the desired operating location of the one or more UAVs 14 being delivered by system 10. In other words, the target region 80 is the area in which a particular UAV 14 is intended to be ultimately deployed to perform a particular operation, such as surveillance, delivering a payload, etc.

With continued reference to FIG. 1, the multi-stage delivery system 10 preferably includes three distinct stages of delivery. Each stage of delivery includes associated hardware designed to allow one or more small UAVs to be introduced into a violent, high-speed air stream and then decelerate and descend in a stable manner to ultimately be deployed in the desired target region 80. According to the first stage, an ammunition-like "pod" 22 is deployed in a first region 20 remote from the target region 80 from an aircraft 12 typically traveling up to about 0.9 Mach at the time of pod 22 deployment from the aircraft 12. The first region 20 will typically be about 10,000–30,000 feet above ground level (AGL). At approximately 10,000 feet AGL, a drogue chute 24 is preferably deployed to decelerate the pod 22 and orient the pod in a nose-down configuration for safe deployment of one or more "capsules" 52.

As will be described in more detail below in reference to FIGS. 2A-2B and 3A-3B, the pod 22 may take many forms but is generally any type of housing having stabilizing aerodynamic guidance features such that it is configured to be deployed from an aircraft or other launching system. Inside the pod 22 is at least one capsule 52, with each capsule 52 dimensioned and configured to securely encase a UAV 14. In preferred embodiments, the pod 22 is configured to be deployed/launched from the weapons bay of the aircraft in any number of manners as known in the art and then remotely controlled to deliver the pod 22 to a desired second region 50. In alternate embodiments, the pod 22 may be dropped from the aircraft 12 to fall to the desired second region 50 under the weight of gravity.

In stage two, at least one capsule 52 is ejected from the pod 22 at the second region 50 such that capsule 52 then descends to the target region 80. The second region 50 in which the capsule 52 is ejected from the pod 22 will typically be between about 6,000-4,000 feet AGL, and most preferably about 5,000 feet AGL. Like the pod 22, the capsule 52 may take many forms but is generally any type of housing having stabilizing aerodynamic guidance features such that it is configured to both securely encase a UAV 14 within the capsule 52 to prevent damage of the UAV 14 throughout the stages of delivery system 10 and provide a controlled descent of the capsule 52 to the target region 80 following its deployment from the pod 22. A drogue chute 54 may also be deployed from the capsule 52 to provide a deceleration and proper orientation of the capsule 52 prior to deployment of the UAV 14.

Finally, in stage three, the UAV 14 is ejected from the capsule 52 for deployment in the target region 80. The UAV 14 will typically be ejected in the vicinity of about 500 feet AGL. At this point, operation of the UAV 14 will be powered up and handed off to a remote operator to complete its mission in the target region 80. Similar to the pod 22 and capsule 52, it should be understood that the UAV 14 may also take many forms. The preferred embodiment is a quad-rotor Group 1 UAV. As described further below with reference to FIGS. 5A-5B, the rotor arms of the UAV 14 are preferably operable to be positioned in a compact storage position when the UAV 14 is encased in the capsule 52 and in an extended flight position when the unmanned aerial vehicle is deployed from the capsule 52. Also, in preferred embodiments, the rotor arms are biased to the extended position such that the rotor arms automatically move from the compact position to the extended position upon the UAV 14 being ejected from the capsule 52.

Figure 2A:
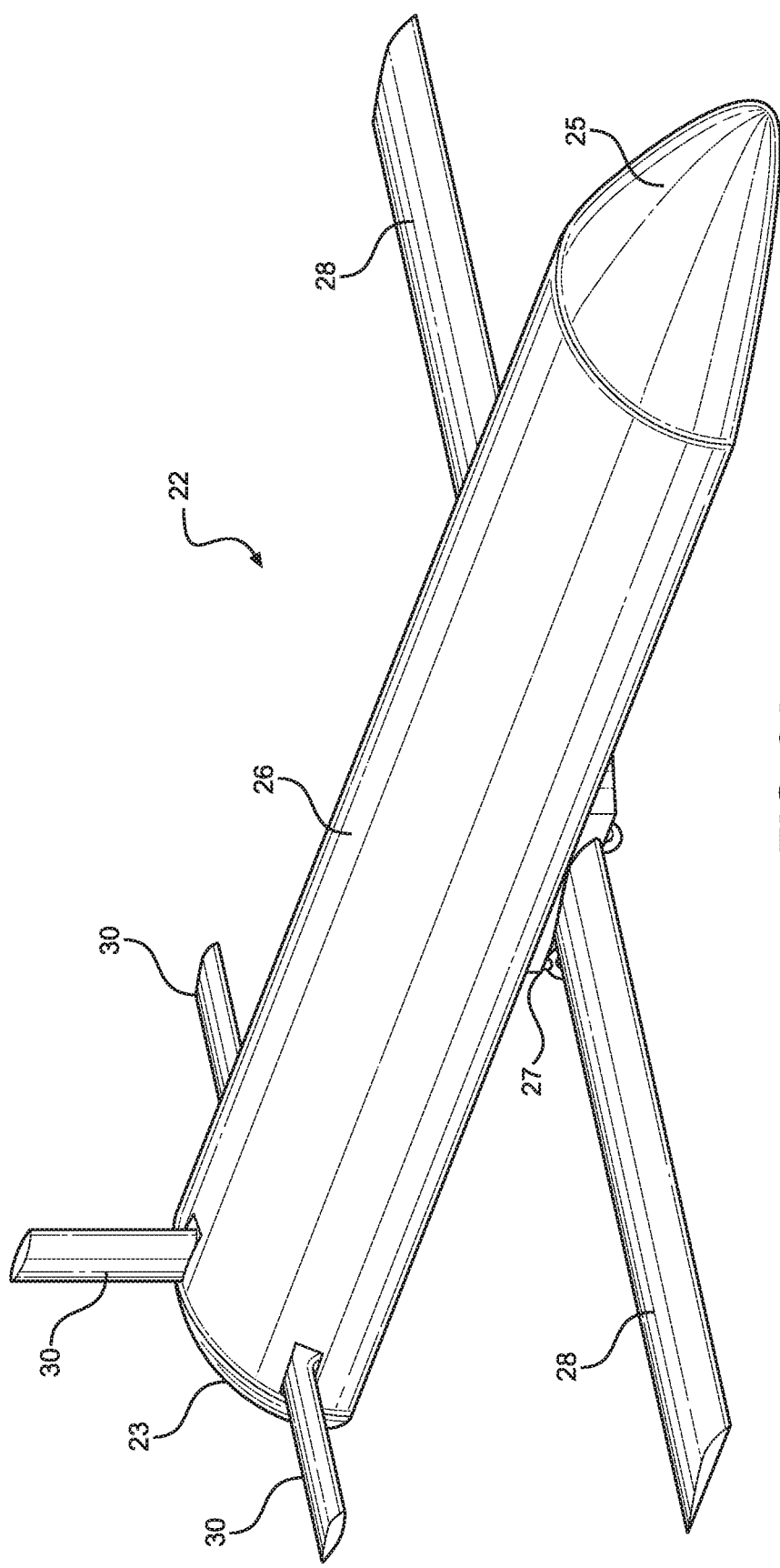
FIG. 2A depicts a perspective view of a pod according to one embodiment of the disclosure.

With reference to FIG. 2A, an exemplary embodiment of the pod 22 is shown with a shape of a standard 1000 lb. Joint Direct Attack Munition (JDAM). The JDAM embodiment ensures compatibility with pre-existing munition deployment systems. More specifically, the preferred embodiment of pod 22 includes a semi-monocoque, partially hollow fuselage 26 with a flattened semi-circular cross section with wings 28 and stabilizers 30. While the wings 28 may take many forms to provide optimum flight characteristics for a given mission as known in the art, FIG. 2A depicts an embodiment with folding wings 28 that are horizontal when in the flight position to increase the glide range of the pod 22 and operable to pivot about a shoulder joint 27 to align them with the fuselage 26 for streamlined storage and transport within the aircraft weapons bay prior to deployment. The stabilizers 30 include two horizontal and one vertical stabilizer. The flattened bottom of the fuselage 26 maximizes the lift-to-drag ratio of the pod 22. The fuselage 26 preferably includes a rear removable portion 23 for ejecting the drogue parachute 24 (shown in FIG. 1) from the rear of the fuselage 26 and a front removable portion 25, preferably in the form of an aerodynamic nose, for ejecting one or more capsules 52 from the front of the fuselage 26. The pod 22 may be formed of various materials such as carbon fiber composite formed in the desired shape.

Figure 2B:
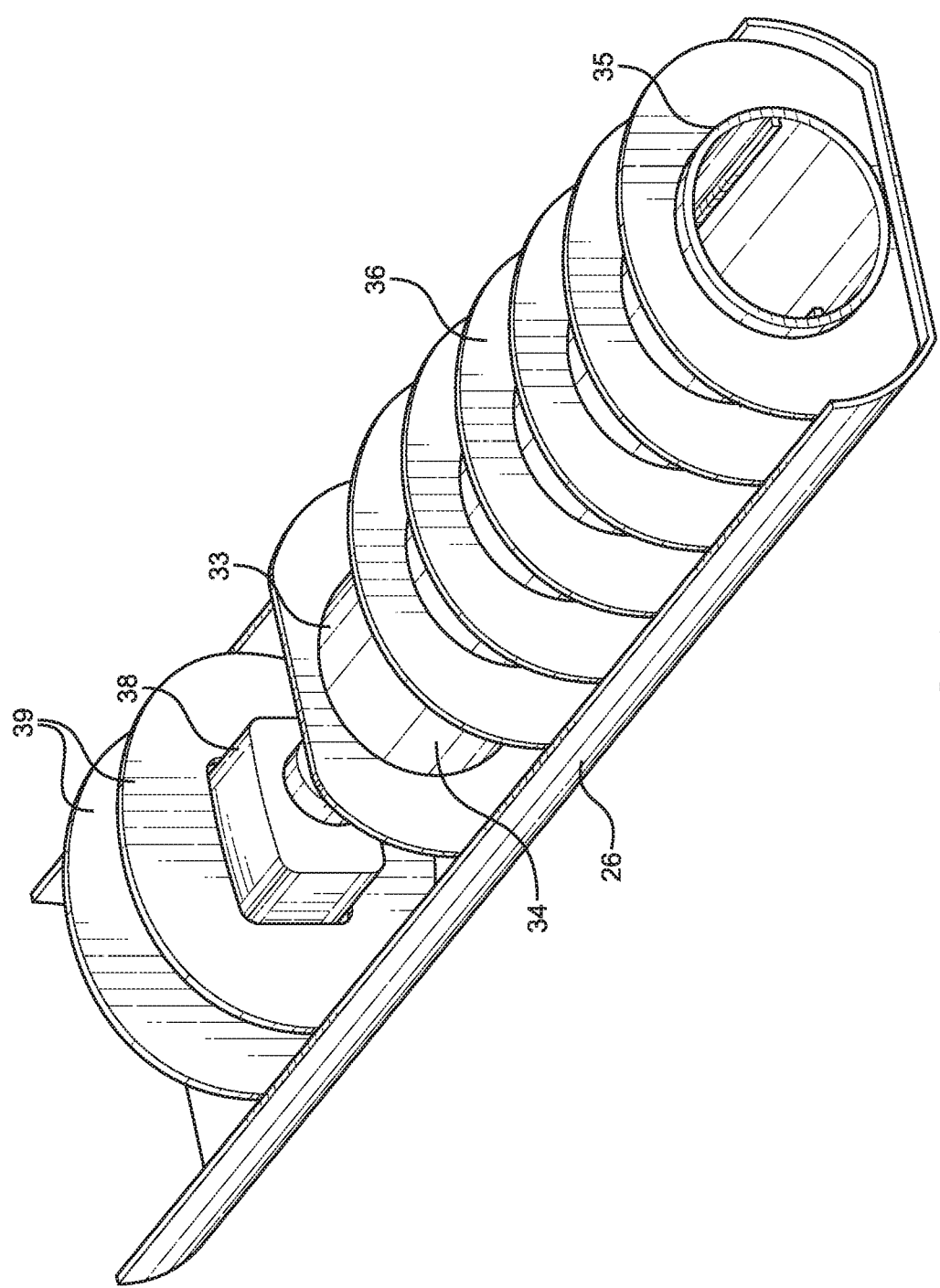
FIG. 2B depicts an internal perspective view of the pod of FIG. 2A according to one embodiment of the disclosure.

With reference to FIG. 2B, which depicts an internal view of the pod 22 of FIG. 2A with a top half and nose portion of the fuselage 26 removed, the pod 22 includes an internal capsule housing portion 34 intended to securely receive a plurality of capsules 52 and a capsule ejection system 38 in operative communication with the capsule housing portion for ejecting the plurality of capsules 52 from the capsule housing portion 34. More specifically, in preferred embodiments, the capsule housing portion 34 is in the form of a tubular pipe having a first end 33 and a second end 35. The second end 35 of the housing portion 34 is disposed adjacent to the removable nose portion 25 of the fuselage 26 while the first end 33 is positioned between the rear removable portion 23 of the fuselage 26 and the second end 35. One or more supports 36 are preferably positioned between the exterior of the tubular housing portion 34 and the internal surface of the fuselage 26 to stabilize the capsule housing portion 34 within the pod 22 during transportation and flight.

With continued reference to FIG. 2B, the capsule ejection system 38 of this embodiment is in the form of a pneumatic piston positioned with respect to the housing portion 34 such that the piston 38 is operable to be advanced (as depicted in FIGS. 3A-3B) from the first end 33 to the second end 35 for ejecting the plurality of capsules 52 from the capsule housing portion 34. To provide as much space as possible between the first end 33 and the second end 35, the piston 38 is preferably formed of a plurality of telescoping sections. To support the piston, supports 39 are preferably positioned between the exterior of a base portion of the piston 38 and the internal surface of the fuselage similar to supports 36 for the capsule housing portion 34. In alternate embodiments, the capsule ejection system 38 may simply be the removal of the nose portion 25 from the fuselage 26 in combination with the deployment of drogue chute 24, which orients the pod 22 vertically as shown in FIG. 1 and allows the capsules 52 to fall under the weight of gravity out of the second end 35 of the capsule housing portion 34. It should also be understood that, in embodiments that include a piston 38 for physically pushing the capsules 52 out of the housing portion 34, gravity may similarly assist the piston 38 in ejecting the capsules 52 out of the pod 22.

With reference to FIG. 3A, which depicts a cross-sectional view of the pod 22 of FIG. 2A-2B with capsules 52 received in the housing portion 34 prior to deployment, the plurality of capsules 52 are positioned successively within the housing portion 34 from the first end 33 to the second end 35. FIG. 3B then shows the same view of FIG. 3A except with the piston 38 advanced towards the second end 35 of the capsule housing portion 34 such that two of the capsules 52 shown in FIG. 3A have been ejected from the housing portion 34. As shown, the piston 38 is aligned along the centerline of the housing portion 34 with a front end dimensioned and configured to correspond to a lower housing section 56 of the capsule 52 being pushed by the piston 38 to evenly distribute the piston force onto the capsule 52 without damaging the capsule during deployment.

Figures 4A, 4B:
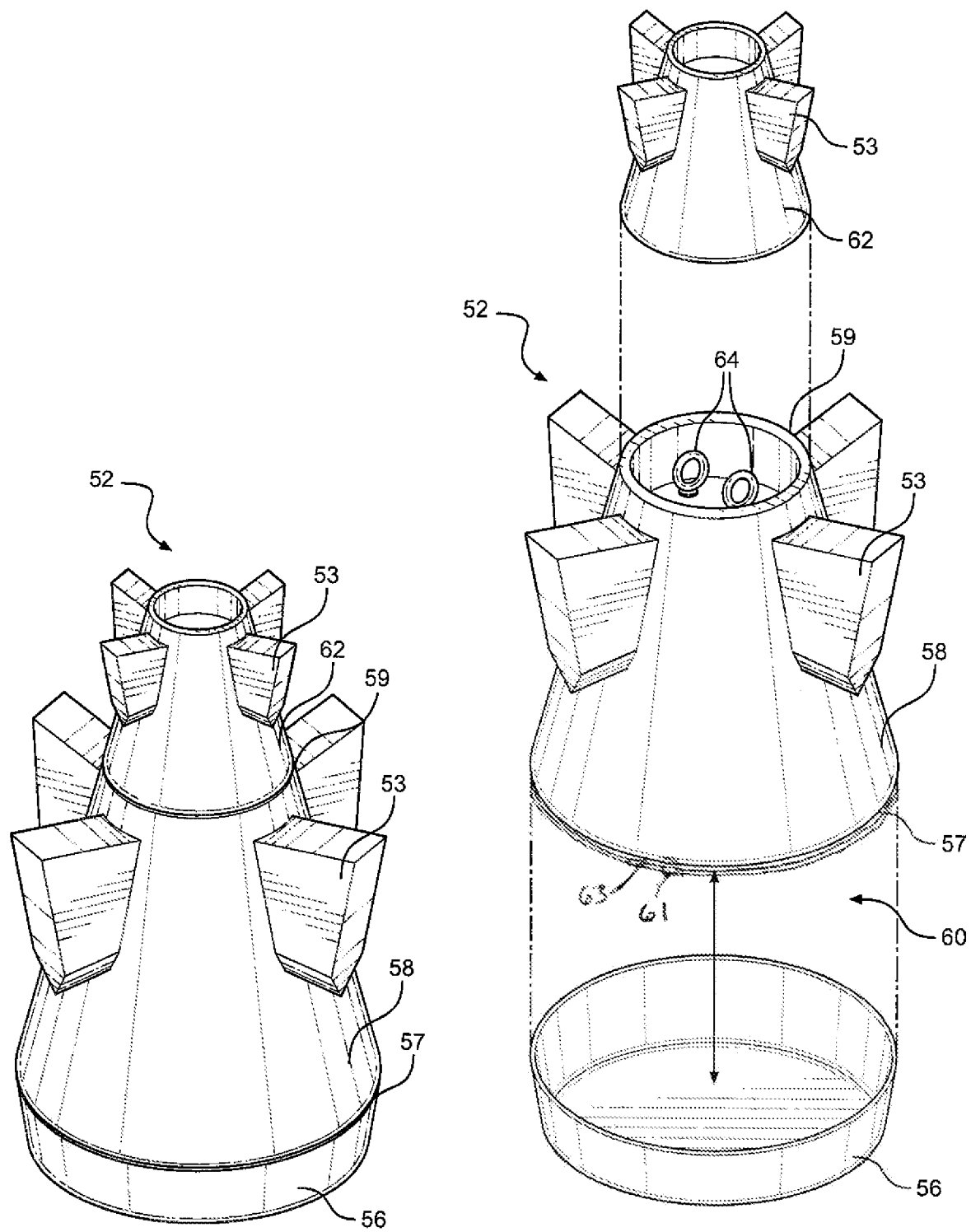
FIG. 4A depicts a perspective view of a capsule according to one embodiment of the disclosure.
FIG. 4B depicts a perspective view of the capsule of FIG. 4A with the lower housing section and chute housing section being separated from the upper housing section of the capsule according to one embodiment of the disclosure.

As shown in FIGS. 4A-4B, the capsule 52 preferably includes an aerodynamic teardrop-shaped exterior with stabilizing fins 53 for assisting the capsule to descend in a stable, upright manner. While other shapes are possible and within the scope of the present disclosure, the capsule 52 is designed to include a UAV housing portion 60 dimensioned and configured to encase a UAV 14 within the capsule 52 and a UAV ejection system for ejecting the UAV 14 from the UAV housing portion 60. In preferred embodiments, and as shown in FIGS. 4A-4B, the UAV housing portion 60 is formed by securing a lower housing section 56 to a bottom end 57 of an upper housing section 58. In operation, the lower housing section 56 is operable to be separated from the upper housing section 58 by the UAV ejection system such that the UAV 14 is ejected from the UAV housing portion 60. For example, according to certain embodiments, the UAV ejection system includes a heat activated adhesive 61 disposed around the bottom end 57 of the upper housing section 58 for securing the lower housing section 56 to the upper housing section 58. An actuator, such as a thin copper wire 63, is embedded within or adjacent to the heat activated adhesive. Thus, when it is desired for the UAV 14 to be ejected from the capsule 52, electric current is directed through the actuator to melt the adhesive 61 such that the lower housing section 56 is released from the upper housing section 58. The UAV 14 then drops by gravity out of the UAV housing portion 60.

Referring still to FIGS. 4A-4B, the upper housing section 58 of the capsule 52 includes one or more attachment mechanisms 64 for securing a drogue chute 54 to the capsule 52 adjacent a top end 59 of the upper housing section 62. Thus, when the capsule 52 is ejected from the pod 22, the drogue chute 54 is deployed from the capsule 52 as shown in FIG. 1. It is noted that the drogue chute 54, teardrop shape, and stabilizing fins 53 are important when deploying the UAV 14 from the capsule 52 because the UAV 14 is a robotic system with numerous important guidance and control sensors that will malfunction if they undergo excessive rotation, such as would occur if the UAV 14 were tumbling during freefall. Thus, incorporation of each of these features was found to provide an inherent stability of the capsule 52.

In certain embodiments, the capsule 52 may further include a chute housing section 62 secured to the top end 59 of the upper housing section 58 for housing the drogue chute 54 prior to deployment of the capsule 52 (i.e., to prevent the chute 54 from becoming entangled within the pod 22). When the capsule 52 is ejected from the pod 22, the chute housing section 62 is released from the upper housing section 58 and the drogue chute 54 is deployed. It should be understood that the chute housing section 62 may be separated from the upper housing section 58 in any number of manners. In preferred embodiments, the chute housing section 62 is secured to the upper housing section 58 using a light or minimal adhesive sufficient to keep the sections together prior to deployment in the pod 22 but insufficient to keep the sections together under the full weight of the capsule 52 following deployment. In other embodiments, an actuator could be supplied around the adhesive to separate the chute housing section 62 from the upper housing section 58 similar to how the lower housing section 56 is separated from the upper housing section 58 as described above.

Figure 5A:
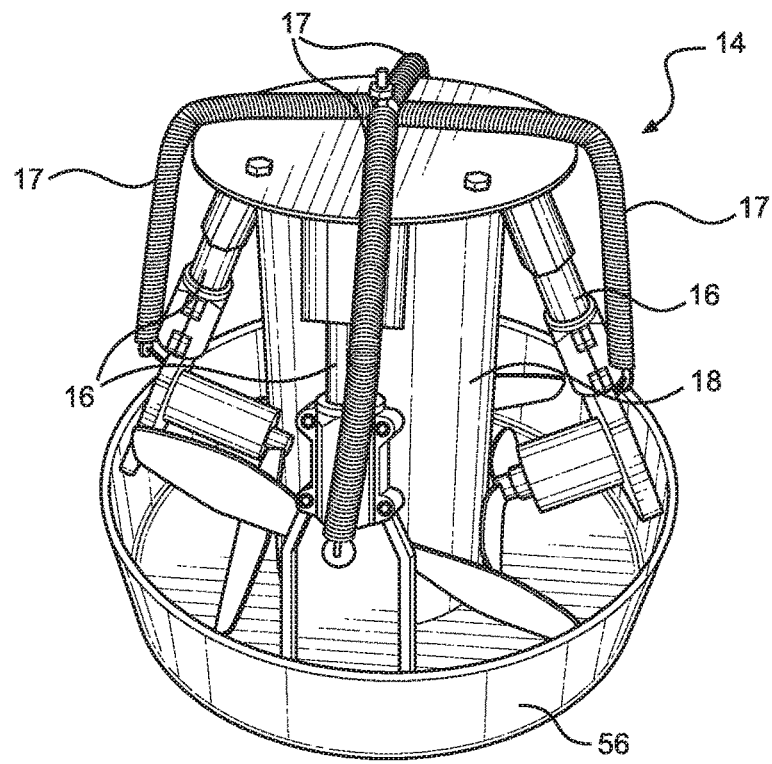
FIG. 5A depicts a UAV in a compact storage position within the lower housing section of the capsule according to one embodiment of the disclosure.
Figure 5B:
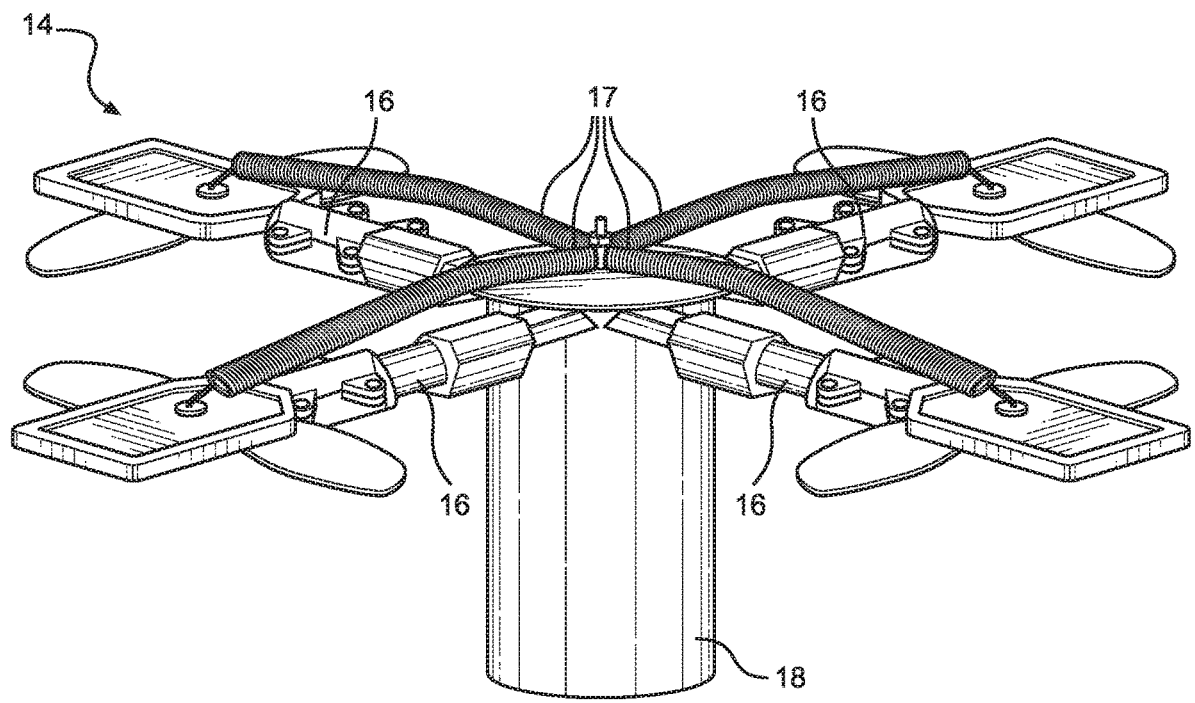
FIG. 5B depicts the UAV of FIG. 5A in an extended flight position according to one embodiment of the disclosure.

Referring to FIGS. 5A-5B, an exemplary embodiment of the UAV 14 is depicted. While it should be understood that the UAV 14 may take many forms and have differing capabilities determined in part by the particular mission of system 10, the UAV 14 preferably includes a plurality of rotor arms 16 that are each operable to be positioned in a compact position (FIG. 5A) when the UAV 14 is encased in a capsule 52 (capsule 52 being represented in FIG. 5A by inclusion of the lower housing section 56). In this configuration, the rotor arms 16 are folded down adjacent to the internal components of the UAV 14 that are housed in UAV housing 18. When the UAV 14 is ejected from capsule 52, the plurality of rotor arms 16 are then operable to be moved from the compact position to an extended flight position (FIG. 5B). In preferred embodiments, each of the plurality of rotor arms 16 are biased to the extended flight position using a plurality of biasing mechanisms 17 (e.g., springs) each operatively connected to one of the rotor arms 16 and the UAV housing 18. The capsule 52 then holds the rotor arms 16 under tension in the compact position while the UAV 14 is disposed within the UAV housing portion 60 and the plurality of rotor arms 16 then automatically move to the extended position upon the UAV 14 being ejected from the capsule 52 by the UAV ejection system.

In summary, the system 10 of the present disclosure advantageously uses a multi-stage airborne deployment process that is highly space efficient while requiring minimal involvement from human operators until the UAV 14 is deployed in a target region. Each stage of the system includes hardware with specific characteristics that allows one or more UAVs 14 to safely transition from one flight mode to the next until it reaches the target region. This combination of stages and devices allows the typically cumbersome and fragile UAVs to be effectively deployed at high speed for long range operations.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for deploying an unmanned aerial vehicle in a target region, the system comprising:
   a pod to be deployed from an aircraft in a first region remote from the target region, the pod comprising a capsule housing portion and a capsule ejection system, the capsule ejection system being in communication with the capsule housing portion, wherein the capsule housing portion is configured to receive a plurality of capsules between a first end and a second end of the capsule housing portion, and the capsule ejection system including comprises a piston operable to be advanced from the first end of the capsule housing portion to the second end of the capsule housing portion for ejection of the plurality of capsules disposed within the capsule housing portion; and
   a capsule disposed in the capsule housing portion of the pod when the pod is deployed from the aircraft, wherein the capsule is ejected from the capsule housing portion by the capsule ejection system when the pod is in a second region remote from the first region and the target region, wherein the capsule comprises:
      a UAV housing portion dimensioned and configured to encase an unmanned aerial vehicle, and
      a UAV ejection system in operative communication with the UAV housing portion for deploying the unmanned aerial vehicle in the target region.

2. A system for deploying an unmanned aerial vehicle in a target region, the system comprising:
   a pod to be deployed from an aircraft in a first region remote from the target region, the pod comprising a capsule housing portion and a capsule ejection system, the capsule ejection system being in communication with the capsule housing portion; and
   a capsule disposed in the capsule housing portion of the pod when the pod is deployed from the aircraft, wherein the capsule is ejected from the capsule housing portion by the capsule ejection system when the pod is in a second region remote from the first region and the target region, wherein the capsule comprises:
      a UAV housing portion dimensioned and configured to encase the unmanned aerial vehicle, and
      a UAV ejection system in operative communication with the UAV housing portion for deploying the unmanned aerial vehicle in the target region,
      wherein the UAV housing portion is formed by an upper housing section and a lower housing section, a parachute is connected to the upper housing section, and the UAV ejection system comprises a release mechanism for separating the lower housing section from the upper housing section such that the unmanned aerial vehicle is deployed in the target region based at least in part by dropping from the upper housing section under the force of gravity, wherein the release mechanism comprises a heat activated adhesive for removably securing the upper housing section to the lower housing section and an actuator for providing heat to the heat activated adhesive for separating the lower housing section from the upper housing section.

3. The system of claim 2 wherein the upper housing section includes a top end and a lower end, the top end having a smaller diameter than the lower end, and the parachute is connected to the top end.

4. The system of claim 3 wherein the upper housing section includes a plurality of stabilizing fins disposed around a periphery of the upper housing section adjacent to the top end.

5. A system for deploying an unmanned aerial vehicle in a target region, the system comprising:
   a pod to be deployed from an aircraft in a first region remote from the target region, the pod comprising a capsule housing portion and a capsule ejection system, the capsule ejection system being in communication with the capsule housing portion;
   a capsule disposed in the capsule housing portion of the pod when the pod is deployed from the aircraft, wherein the capsule is ejected from the capsule housing portion by the capsule ejection system when the pod is in a second region remote from the first region and the target region, wherein the capsule comprises:
      a UAV housing portion dimensioned and configured to encase an unmanned aerial vehicle, and
      a UAV ejection system in operative communication with the UAV housing portion for deploying the unmanned aerial vehicle in the target region; and
   an unmanned aerial vehicle dimensioned and configured to be encased in the capsule, the unmanned aerial vehicle comprising a plurality of rotor arms each of which has a rotor joined thereto, wherein the rotors on said rotor arms lie in a common plane when the unmanned aerial vehicle is in flight position, said rotor arms being operable to be positioned in a compact position wherein the rotor arms are folded to a position that is out of said common plane when the unmanned aerial vehicle is encased in the capsule, and said rotor arms are in an extended position when the unmanned aerial vehicle is deployed from the capsule in flight position.

6. The system of claim 5 wherein each of the plurality of rotor arms are biased to the extended position such that the plurality of rotor arms automatically moves to the extended position upon the unmanned aerial vehicle being ejected from the capsule by the UAV ejection system.

7. A system for deploying unmanned aerial vehicles in a target region, the system comprising:
- a plurality of unmanned aerial vehicles each operable to be remotely controlled by an unmanned aerial system, each of the plurality of unmanned aerial vehicles operable to transition between a compact position and an extended flight position;
- a pod to be deployed from an aircraft in a first region remote from the target region and to travel from the first region to a second region that is remote from both the first region and the target region based on instructions from the unmanned aerial system, the pod comprising a capsule housing portion and a capsule ejection system, the capsule ejection system being in operative communication with the capsule housing portion, wherein the capsule housing portion is configured to receive a plurality of capsules between a first end and a second end of the capsule housing portion, and the capsule ejection system comprises a piston operable to be advanced from a first end of the capsule housing portion to a second end of the capsule housing portion for ejection of the plurality of capsules disposed within the capsule housing portion;
- the plurality of capsules dimensioned and configured to be disposed in the capsule housing portion as the pod is deployed from the aircraft, and ejected from the capsule housing portion by the capsule ejection system in the second region, each capsule comprising:
  - a UAV housing portion dimensioned and configured to encase one of the plurality of unmanned aerial vehicles in the compact position,
  - a parachute operable to be deployed after the capsule is ejected from the capsule housing portion for providing a controlled drop of the capsule from the second region to the target region, and
  - a UAV ejection system in operative communication with the UAV housing portion for deploying one of the unmanned aerial vehicles encased in the UAV housing portion in the target region, the unmanned aerial vehicle configured to transition from the compact position to the extended flight position upon deployment of the unmanned aerial vehicle in the target region.

8. A system for deploying unmanned aerial vehicles in a target region, the system comprising:
- a plurality of unmanned aerial vehicles each operable to be remotely controlled by an unmanned aerial system, each of the plurality of unmanned aerial vehicles operable to transition between a compact position and an extended flight position;
- a pod to be deployed from an aircraft in a first region remote from the target region and to travel from the first region to a second region that is remote from both the first region and the target region based on instructions from the unmanned aerial system, the pod comprising a capsule housing portion and a capsule ejection system, the capsule ejection system being in operative communication with the capsule housing portion;
- a plurality of capsules dimensioned and configured to be disposed in the capsule housing portion as the pod is deployed from the aircraft, and ejected from the capsule housing portion by the capsule ejection system in the second region, each capsule comprising:
  - a UAV housing portion dimensioned and configured to encase one of the plurality of unmanned aerial vehicles in the compact position,
  - a parachute operable to be deployed after the capsule is ejected from the capsule housing portion for providing a controlled drop of the capsule from the second region to the target region, and
  - a UAV ejection system in operative communication with the UAV housing portion for deploying one of the unmanned aerial vehicles encased in the UAV housing portion in the target region, the unmanned aerial vehicle configured to transition from the compact position to the extended flight position upon deployment of the unmanned aerial vehicle in the target region,
  - wherein the UAV housing portion is formed by an upper housing section and a lower housing section, the parachute is connected to the upper housing section, and the UAV ejection system includes a release mechanism for separating the lower housing section from the upper housing section such that the unmanned aerial vehicle is deployed in the target region based at least in part by dropping from the upper housing section under the force of gravity, wherein the release mechanism comprises a heat activated adhesive for removably securing the upper housing section to the lower housing section and an actuator for providing heat to the heat activated adhesive for separating the lower housing section from the upper housing section.

9. A system for deploying unmanned aerial vehicles in a target region, the system comprising:
- a plurality of unmanned aerial vehicles each operable to be remotely controlled by an unmanned aerial system, each of the plurality of unmanned aerial vehicles operable to transition between a compact position and an extended flight position wherein each of the plurality of unmanned aerial vehicles include a plurality of rotor arms each of which has a rotor joined thereto, wherein the rotors on said rotor arms lie in a common plane when the unmanned aerial vehicle is in flight position, said rotor arms being operable to be positioned in a compact position wherein the rotor arms are folded to a position that is out of said common plane when the unmanned aerial vehicle is encased in the capsule, and said rotor arms are biased to the extended position such that the plurality of rotor arms automatically moves to the extended position upon the unmanned aerial vehicle being ejected from the capsule by the UAV ejection system;
- a pod to be deployed from an aircraft in a first region remote from the target region and to travel from the first region to a second region that is remote from both the first region and the target region based on instructions from the unmanned aerial system, the pod comprising a capsule housing portion and a capsule ejection system, wherein the capsule housing portion is configured to receive a plurality of capsules between a first end and a second end of the capsule housing portion, and the capsule ejection system is in operative communication with the capsule housing portion;

the plurality of capsules dimensioned and configured to be disposed in the capsule housing portion as the pod is deployed from the aircraft, and ejected from the capsule housing portion by the capsule ejection system in the second region, each capsule comprising:

a UAV housing portion dimensioned and configured to encase one of the plurality of unmanned aerial vehicles in the compact position, a parachute operable to be deployed after the capsule is ejected from the capsule housing portion for providing a controlled drop of the capsule from the second region to the target region, and a UAV ejection system in operative communication with the UAV housing portion for deploying one of the unmanned aerial vehicles encased in the UAV housing portion in the target region, the unmanned aerial vehicle configured to transition from the compact position to the extended flight position upon deployment of the unmanned aerial vehicle in the target region.

10. A method for deploying an unmanned aerial vehicle in a target region, the method comprising:

deploying a pod from an aircraft in a first region remote from the target region, wherein the first region includes an altitude of about 10,000 feet above ground level or greater, the pod including a capsule housing portion and a capsule ejection system, the capsule housing portion having a capsule disposed in the capsule housing portion, the capsule including a UAV housing portion and a UAV ejection system, the UAV housing portion having the unmanned aerial vehicle encased in the UAV housing portion;

flying the pod from the first region to a second region remote from the first region and the target region with the capsule disposed in the capsule housing portion, wherein the second region includes an altitude between about 5,000 feet to about 500 feet above ground level;

activating the capsule ejection system to eject the capsule from the capsule housing portion when the pod is disposed in the second region;

activating the UAV ejection system to eject the unmanned aerial vehicle from the UAV housing portion when the capsule is disposed in the target region; and remotely controlling the unmanned aerial vehicle in the target region following ejection from the capsule.

11. The method of claim 10 further comprising deploying a parachute from the pod to decelerate the pod prior to ejection of the capsule from the capsule housing portion and deploying a parachute from the capsule for providing a controlled drop of the capsule from the second region to the target region.

12. The method of claim 10 wherein the capsule housing portion is configured to receive a plurality of capsules between a first end and a second end of the capsule housing portion, the capsule ejection system including a piston operable to be advanced from the first end of the capsule housing portion to the second end of the capsule housing portion, and the step of activating the capsule ejection system includes advancing the piston from the first end to the second end of the capsule housing portion for ejection of the plurality of capsules disposed within the capsule housing portion.

13. The method of claim 10 wherein the UAV housing portion is formed by an upper housing section and a lower housing section, the parachute is connected to the upper housing section, and the UAV ejection system includes a release mechanism for separating the lower housing section from the upper housing section, and the step of activating the UAV ejection system further includes activating the release mechanism such that the unmanned aerial vehicle is deployed in the target region based at least in part by dropping from the upper housing section under the force of gravity.

14. The method of claim 13 wherein the release mechanism comprises a heat activated adhesive for removably securing the upper housing section to the lower housing section and an actuator for providing heat to the heat activated adhesive for separating the lower housing section from the upper housing section.

15. The system of claim 10 wherein the pod is remotely controlled to deliver the capsule from the first region to the second region.

\* \* \* \* \*